United States Patent
Sabbaugh

(10) Patent No.: US 7,213,537 B2
(45) Date of Patent: May 8, 2007

(54) AIRFLOW DIVERTER FOR USE IN AN AQUARIUM

(76) Inventor: Justin Sabbaugh, 5571 Huron Hills Dr., Commerce Township, MI (US) 48382

( * ) Notice: Subject to any disclaimer, the term of this patent is extended or adjusted under 35 U.S.C. 154(b) by 0 days.

(21) Appl. No.: 10/370,941

(22) Filed: Feb. 21, 2003

(65) Prior Publication Data

US 2004/0163605 A1    Aug. 26, 2004

(51) Int. Cl.
*A01K 63/00*    (2006.01)

(52) U.S. Cl. .................. 119/254; 119/253; 119/256; 119/263

(58) Field of Classification Search ............... 119/245, 119/254, 253, 251, 261, 263, 269, 259, 246, 119/255, 256, 247, 249; 210/167.21, 167.26; D30/106, 104
See application file for complete search history.

(56) References Cited

U.S. PATENT DOCUMENTS

| | | | | |
|---|---|---|---|---|
| 3,326,185 A | * | 6/1967 | Perez | 119/254 |
| 3,720,318 A | * | 3/1973 | Cohen | 210/169 |
| 4,082,063 A | * | 4/1978 | Strickland | 119/254 |
| 4,752,388 A | * | 6/1988 | Ng | 210/169 |
| 4,927,568 A | * | 5/1990 | Campau | 261/36.1 |
| 5,034,165 A | * | 7/1991 | Willinger et al. | 261/122.1 |
| 5,205,237 A | * | 4/1993 | Skeggs et al. | 119/226 |
| 5,657,719 A | * | 8/1997 | Whan | 119/263 |
| 6,197,835 B1 | * | 3/2001 | Ganan-Calvo | 516/10 |
| 6,314,910 B1 | * | 11/2001 | Tracy | 119/51.04 |
| 6,327,997 B1 | * | 12/2001 | Terry et al. | 119/246 |
| 6,464,886 B2 | * | 10/2002 | Ganan-Calvo | 210/758 |

FOREIGN PATENT DOCUMENTS

DE    3443687 A1    *    6/1986

* cited by examiner

*Primary Examiner*—Andrea M. Valenti
(74) *Attorney, Agent, or Firm*—Gifford, Krass, Sprinkle, Anderson & Citkowski, P.C.

(57) ABSTRACT

A method of altering airflow of an aquarium air supply by placing a bottle over the air supply thus, altering the airflow. The method can be accomplished using a decorative attachment assembly that covers an air stone in an aquarium. The assembly includes a bottle having at least a first hole and a second hole, wherein the first hole is capable of accepting an aerating device, and the second hole is sized to allow air to flow from the aerating device into the aquarium.

5 Claims, 1 Drawing Sheet

AIRFLOW DIVERTER FOR USE IN AN AQUARIUM

BACKGROUND OF THE INVENTION

1. Technical Field

The present invention generally relates to an airflow diverter. More specifically, the present invention relates to an aquarium airflow diverter.

2. Description of Related Art

Air stones are employed frequently for aerating the water of an aquarium to provide oxygen for fish and other marine life that may be present in the aquarium. The air stone is constructed of a body of porous material through which air can propagate. In a typical installation in an aquarium the air stone is connected via a flexible air tubing to an air pump located outside of the aquarium. The pump pumps air via the tubing into the air stone. The air stone then disperses the air to form a stream of bubbles that migrate upwardly through the water. The air stone can also be placed within the lift tube of an aquarium undergravel filter to allow an entrained stream of bubbles to draw water through the lift tube and, thereby, circulate water through the filter.

The construction of the air stone permits its use in situations, other than that of the fore-going aquarium, in which it is desired to disperse a gas within a fluid. However, for purposes of demonstrating the use of the invention, it is presumed that the air stone is to be employed for aeration of water in an aquarium.

A problem arises in the construction of air stones in that air forced into the stone tends to propagate through a portion of the porous material of the stone located generally in the vicinity of the air inlet to the stone, while the remaining portion of the body of porous material is essentially inactive in the process of dispersing the air. As a result, there is a significant diminution in the esthetic appearance to the paths of bubbles emanating from the air stone because the bubbles emanate only from the upper portion of the stone rather than emanating uniformly from the entire exterior surface of the stone. In addition, there is usually a mineral build up at the end of the air inlet into the stone that starts to clog after a while. Also, since the path of air is only through the upper part of the stone, the underutilization of the lower portion of the air stone results in a more rapid clogging and wearing of the upper portion of the air stone resulting in a more frequent need for replacing the air stone.

It would therefore be useful to develop a device for altering the flow of air from an air stone. It would also be useful to develop a device that improves the appearance of the air stone, thus making the air stone more attractive.

SUMMARY OF THE INVENTION

According to the present invention, there is provided a method of altering airflow of an aquarium air supply by placing a bottle over the air supply and altering the airflow. Also provided is a decorative attachment assembly for use in an aquarium. The assembly including a bottle having at least a first hole and a second hole, wherein the first hole is capable of accepting an aerating device, and the second hole is of a size sufficient to allow air to flow from the aerating device into the aquarium.

BRIEF DESCRIPTION OF THE DRAWINGS

Other advantages of the present invention are readily appreciated, as the invention becomes better understood by reference to the following detailed description when considered in connection with the accompanying drawings, wherein.

DETAILED DESCRIPTION OF THE INVENTION

Figure 1:
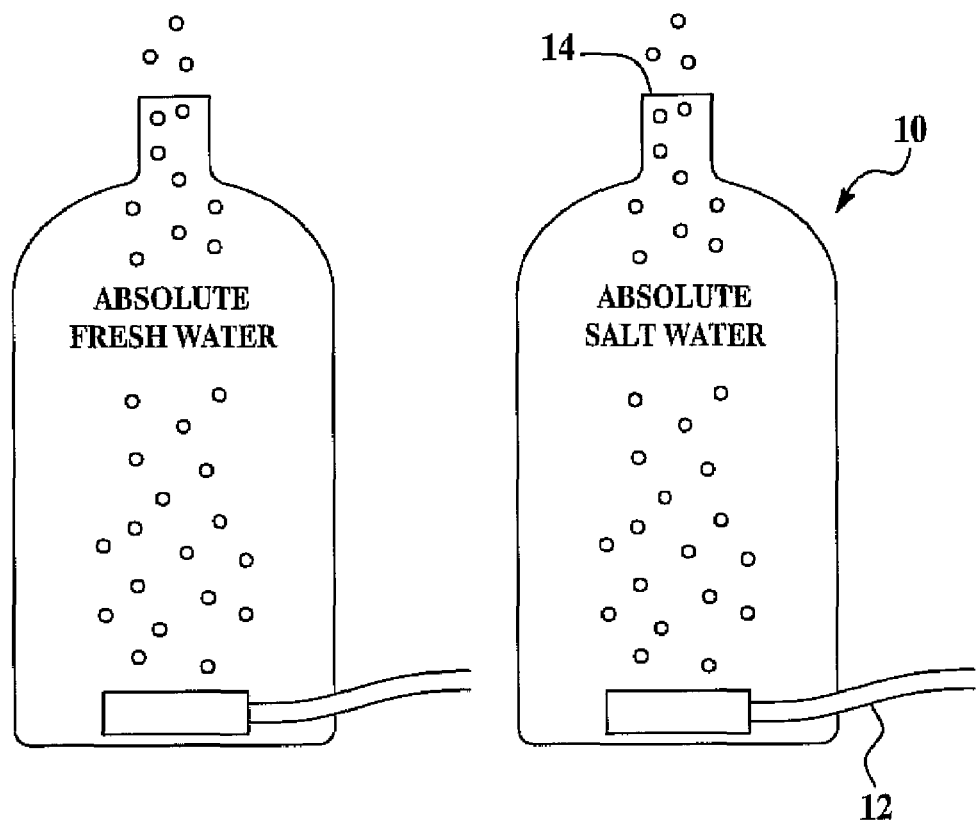
FIG. 1 shows the bottle of the present invention.
Figure 2:
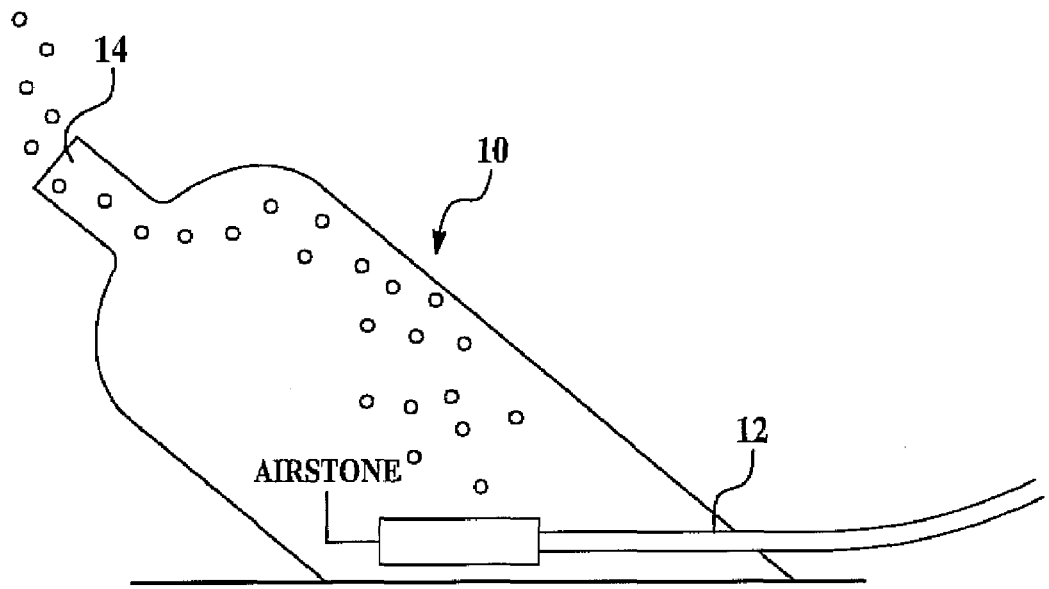
FIG. 2 shows a side view of the bottle of the present invention positioned at an angle within the aquarium.

Generally the present invention provides a method and device for altering the airflow in an aquarium. The present invention also provides a device for covering an air stone. The device is preferably an attractive bottle 10 that disguises the presence of the air stone while directing the flow of air from the air stone in a desired direction.

It is well known to those of skill in the art that aerating devices are used in aquariums. One problem with such aerating devices is that they do not evenly distribute the flow of air bubbles and are unattractive to view in the aquarium. Since many individuals who have aquariums in their homes include in the aquariums other display pieces for making the aquarium more attractive, it is more desirable to have a product that is capable of at least partially blocking the view of the aerating device and any filters associated therewith. The present invention accomplishes this by covering the aerating device with a bottle 10 or other container capable of having a first hole 12 and a second hole or spout 14 spaced therefrom. The aerating device is placed within the bottle 10 and the air is allowed to escape from the top of the bottle 10.

The airflow altering device is preferably a bottle 10. The bottle 10 is placed within the aquarium and the aerating device is placed within the bottle 10. The bottle 10 is then partially buried in the gravel found on the bottom of the aquarium. This can be at any angle desired by the individual placing the bottle 10. Thus the bottle 10 can appear to be part of buried treasure or can be standing upright within the aquarium.

The bottle 10 can be any type of bottle. The bottle 10 can be made from glass, plastic, or of any other material that can withstand the rigors of a water environment. Examples of such bottles can be liquor bottles, wine bottles, decorative bottles, or artistic bottles available to individuals. The bottle 10 of the present invention can be of any color that glass can be formed, it can be clear, opaque, or completely tinted thus preventing light to shine through. Therefore, any bottle can be utilized. All that is required is that the bottle 10 be able to withstand having a hole made in the bottle 10 that enables the insertion of an aerating device into the bottle 10.

The bottle 10 of the present invention includes at least two holes. The first hole 12 is a hole into which an aerating device is placed. The first hole 12 is typically located at the base of the bottle 10. Alternatively, the first hole 12 can be located anywhere on the bottle 10 that will be in close proximity to the bottom of the aquarium in which the bottle 10 is placed. In other words, the bottle is modified so that there are two holes in the bottle while not altering the general appearance of the bottle. The bottle 10 is not required to have an actual base, therefore if one does not wish to drill a hole, they can remove the bottom of the bottle 10 and the aerating device can be placed into the bottle 10 from the lack of base. The second hole 14 is at the end of the bottle 10 that is facing upward. It is through the second hole or spout 14 that the air bubbles are allowed to escape, thus aerating the aquarium.

The aerating device can be any aerating device known to those of skill in the art. Such a device can be as simple as a hose pumping air into the aquarium to an air stone or more complicated system. The air stone that can be used in conjugation with the present invention can be any aerating device that is known to those of skill in the art. The aerating device is typically continually connecting to an aerating processor through an airline tubing. The aerating processor maintains a constant flow of air to the aerating device thus maintaining the proper aeration of the water present in the aquarium. An example of such an aerating device can be used in an aquarium as disclosed below.

An aerating device can be used in aquarium tank constructed of transparent glass walls and holding water for support of marine life. A layer of gravel is typically disposed on a bottom wall of the tank. An air stone rests upon the gravel, and is connected by a connector to an air inlet conduit constructed as flexible plastic tubing. An air pump located outside of the tank is connected to the tubing for pumping air into the air stone. The air stone is fabricated of a porous material that is held together by cement, such as a one part acrylic adhesive material. The air stone is permeable to air. The density of the air stone can be varied. However, generally, the greater the density the more air pressure will be needed. Air delivered by the pump through the tubing permeates through the pores of the material of the air stone to be dispersed and to emit bubbles along the outer surface of the air stone. The bubbles migrate upwards through the water to aerate the water and to introduce a movement to the water by virtue of entrainment of the bubbles within the water.

An under gravel aquarium filter is installed in the bottom of the aquarium tank. The filter comprises a perforated plate having depending leg portions along the outer edges of the plate for supporting the plate parallel to and spaced apart from the bottom wall to form therewith a chamber. A layer of gravel is disposed along the top surface of the perforated plate. An airlift tube submerged within the water is oriented vertically, and passes through the layer of gravel to be seated within an aperture of the plate. The aperture allows the tube to communicate with the chamber. The air stone with the air-supply tubing are disposed within the lift tube with the air stone being located adjacent the bottom of the lift tube.

In operation of the filter, bubbles emanate from the air stone, become entrained in a column of water within the lift tube, and introduce an upward flow of water within the lift tube as the bubbles migrate upwards through the lift tube. As the water flows upward through the lift tube, water from the chamber enters the bottom of the lift tube, and other water from the central region of the tank moves downward through the layer of gravel and through perforations of the plate into the chamber. Thus, there is circulation of water about the tank, with circulated water passing through the filter to produce clear water within the chamber. The gravel and the perforated plate serve to filter debris and pollutants from the aquarium water while the air stone aerates the water to provide oxygen for marine life which may be placed in the aquarium tank.

The bubbles emanate from the upper portion of the air stone in the vicinity of the air output of the stem. This occurs because the propagation path of air through the porous material as shown by the arrows is relatively short in the vicinity of the stem, and relatively long in a direction downward from the stem towards the bottom of air stone. Resistance to passage of air through the porous material of the stone increases with propagation distance. Thus, all or nearly all of the bubbles appear in the upper portion of the stone while virtually no bubbles appear at the lower portion of the stone.

The extent from which the bubbles leave from the exterior surface of the air stone depends upon a combination of factors including the density of the air stone and the amount of air pressure supplied. For a denser air stone, and with sufficient air supply, bubbles can be forced to leave from a lower portion of the air stone. However, this requires considerable additional pressure that is often not available in aquarium systems. This is especially a problem where large air stones are utilized. Frequently, such large air stones are desirable in order to keep the air tubing down and prevent it from bobbing upward. However, with such large air stones being very dense, the amount of air pressure required to drive the air out of the lower portions of the air stone becomes impractical to achieve with regular air pumps and, would tend to damage the air pump if driven so hard. Accordingly, typically with standard air stones the bubbles only leave from the upper part of the air stone.

This presents a poor aesthetic appearance to the air stone. Additionally, since only the upper portion is being utilized, it tends to clog and once it clogs, it retards the flow of air. It also presents a non-uniform utilization of the material of the air stone since the bottom half is hardly used. This becomes a further problem since at the exit of the stem, there tends to be a mineral build-up as a result of the content of the water and this further clogs the flow of air so that after a while the standard air stone becomes a poor supply of air to the aquarium tank.

In the construction of the air stone, the stone comprises a cylindrical sidewall that encloses and defines the chamber, and a lower end wall, which closes off the lower end of the chamber. Preferably, the thickness of the lower end wall is equal to the thickness of the sidewall so as to provide for equality of propagation paths for air propagating from the chamber through the porous material of the stone. This enables the air to exit in dispersed fashion as the bubbles from an outer surface of the stone.

In inserting the stem into the port of the chamber, the stem is coated with a barrier layer, typically adhesive material and secured within the chamber. The adhesive material can be of the same type of cement that is used to retain the air stone material together which can be a one part acrylic material without the use of any catalyzers. The entire length of the stem is coated and then inserted into the chamber. However, as will be described hereinafter, the extent of the coating can vary dependent upon the density of the air stone material.

As a result of the barrier layer, the flow of air it receives a greater resistance to flow in the upper half of the air stone material. As a result, the air leaving from the stem enters into the plenum formed within the chamber and disperses through the walls of the air stone in the lower half of the air stone. Because the sidewalls and bottom wall thickness of the air stone material surrounding the plenum is substantially equal, air will leave equally from the sidewalls below the stem and the bottom wall.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. An air flow diverter for use in water-filled aquarium having a bottom, said diverter comprising:

a bottle having a base completely removed defining an inclined opening relative to a sidewall of the bottle, said sidewall tapering to a spout and said inclined opening defining an area that is greater than an area of said spout and accepting an aerating device, and said spout vertically displaced upward and horizontally relative to the aerating device and sized to allow air flow to contact a non-vertical portion of the sidewall of said bottle before exiting the spout from the aerating device together with upwardly moving water to exit said bottle into the aquarium; and gravel within the aquarium and upon which rests said bottle, said spout is positioned at an inclined angle in relation to the bottom of the aquarium.

2. The diverter according to claim 1, wherein said bottle is selected from the group consisting of liquor bottles, wine bottles, decorative bottles, and artistic bottles.

3. The diverter according to claim 1, wherein said bottle is opaque.

4. The diverter according to claim 1, having a first hole located in the sidewall of said bottle and receiving air line tubing in communication with the aerating device.

5. The diverter according to claim 1 wherein the aerating device is an air stone.

* * * * *

UNITED STATES PATENT AND TRADEMARK OFFICE
CERTIFICATE OF CORRECTION

| | | |
|---|---|---|
| PATENT NO. | : 7,213,537 B2 | Page 1 of 1 |
| APPLICATION NO. | : 10/370941 | |
| DATED | : May 8, 2007 | |
| INVENTOR(S) | : Justin Sabbaugh | |

It is certified that error appears in the above-identified patent and that said Letters Patent is hereby corrected as shown below:

Column 5, line 7, after "an area that" insert --an opening in a base cut at a non-perpendicular angle of defining a base--

Signed and Sealed this

Seventh Day of August, 2007

JON W. DUDAS
*Director of the United States Patent and Trademark Office*